United States Patent
Giezen et al.

(10) Patent No.: US 11,477,998 B2
(45) Date of Patent: Oct. 25, 2022

(54) STRUCTURED PROTEIN COMPOSITIONS

(71) Applicant: Ojah B.V., Ochten (NL)

(72) Inventors: Franciscus Egenius Giezen, Rhenen (NL); Wouter Wilhelmus Johannes Theodorus Jansen, Zevenaar (NL); Jeroen Harold Anton Willemsen, Apeldoorn (NL)

(73) Assignee: OJAH B.V., Ochten (NL)

( * ) Notice: Subject to any disclaimer, the term of this patent is extended or adjusted under 35 U.S.C. 154(b) by 104 days.

(21) Appl. No.: 16/913,769

(22) Filed: Jun. 26, 2020

(65) Prior Publication Data

US 2020/0329736 A1 Oct. 22, 2020

Related U.S. Application Data

(63) Continuation of application No. 14/116,860, filed as application No. PCT/NL2012/050320 on May 10, 2012, now Pat. No. 10,716,319.

(30) Foreign Application Priority Data

May 13, 2011 (EP) .................................... 11166038

(51) Int. Cl.
- *A23J 3/22* (2006.01)
- *A23J 3/26* (2006.01)
- *A23J 3/16* (2006.01)
- *A23P 30/20* (2016.01)
- *A23P 30/30* (2016.01)

(52) U.S. Cl.
CPC ................. *A23J 3/227* (2013.01); *A23J 3/16* (2013.01); *A23J 3/26* (2013.01); *A23P 30/20* (2016.08); *A23P 30/30* (2016.08)

(58) Field of Classification Search
CPC ...... A23J 3/227; A23J 3/16; A23J 3/26; A23P 30/20; A23P 30/30
USPC ......................................................... 426/104
See application file for complete search history.

(56) References Cited

U.S. PATENT DOCUMENTS

| | | | | | |
|---|---|---|---|---|---|
| 3,845,228 | A | * | 10/1974 | Atkinson | ................... A23J 3/26 426/656 |
| 4,888,198 | A | * | 12/1989 | Beery | ....................... A23J 3/26 426/656 |

* cited by examiner

*Primary Examiner* — Brent T O'Hern

(74) *Attorney, Agent, or Firm* — Innovation Capital Law Group, LLP; Vic Lin

(57) ABSTRACT

An extrusion process is disclosed for turning vegetable protein compositions such as soy protein into a fibrous, meat-like structure. The process involves the application of relatively high moisture contents. An open structure is produced that can be infused with water so as to influence the product's tenderness. The products of the invention can be provided with a fibrosity and tenderness at will. The invention offers the possibility to include relatively high amounts of fat in the product.

22 Claims, No Drawings

US 11,477,998 B2

STRUCTURED PROTEIN COMPOSITIONS

CROSS-REFERENCE TO RELATED APPLICATIONS

This application is a divisional of U.S. Non-Provisional patent application Ser. No. 14/116,860 filed Dec. 30, 2013, now U.S. Pat. No. 10,716,319, which is a National Phase of PCT/NL2012/050320 filed May 10, 2012, which claims priority to EP No. 11166038.7 filed May 13, 2011, the disclosures of which are incorporated by reference herein.

FIELD OF THE INVENTION

The invention pertains to an extrusion process for making structured vegetable protein compositions, particularly compositions having a fibrous meat-like structure. The invention further pertains to meat-like compositions having a high water-absorption capacity and to the use of vegetable protein in making a range of edible products comprising different meat-like structures.

BACKGROUND TO THE INVENTION

It is well-known to use vegetable protein sources as a replacement for animal protein, including meat. This is widely used so as to provide the necessary proteins in a vegetarian diet. During the past decade, attention has increasingly emerged on reducing the consumption of meat. This has various backgrounds, depending on, e.g., the region of the world, including health benefits, meat scarcity, and social and environmental desires, such as animal welfare and reducing the effects of meat-production for the release of $CO_2$ into the environment.

A major limitation to attempts to reduce the consumption of meat is the general acceptability of vegetable protein products as meat-replacements. In order for these products to be generally accepted, it is considered that such meat-replacement should actually resemble meat. Although many different products exist on the basis of, e.g., soy-bean protein that are claimed to resemble meat, these products to many consumers are still not sufficiently alike meat to really count as an acceptable replacement The main route in the art in providing acceptable meat-replacements is to try and provide a meat-like fibrous structure. A further desire is to provide a process by which a range of meat-replacements can be produced on the basis of vegetable protein. For, it makes quite a difference whether the structure is produced as a replacement for minced meat, for chicken, pork steak, or for beef. A largely unmet desire is to provide a process that is capable of producing vegetable protein-based analogues of the more challenging meat structures, such as pork steak or beef. A particular further desire is to provide a process that is capable of being tuned towards the production of any one of a variety of meat replacements, ranging from minced meat to ham, chicken, or beef.

Several references address the production of fibrous, sometimes meat-like protein structures.

WO 03/07729 concerns a method of continuously preparing a retextured food product from a protein-rich raw material of animal and/or plant origin. In an extruder the raw material is subjected to mixing, cooking, and plasticizing steps, and cooled gradually in an extrusion die to a temperature that preferably is 40° C. to 80° C. In general products are obtained having a longitudinal fibrous structure. Such a structure is not generally acknowledged as being meat-like. To the extent that meat-like structures are suggested, this refers to a fibrous sheet structure. Whilst said to be a approximation of poultry meat, this is a relative simplification of such meat.

WO 2009/105654 relates to a protein composition for meat products or meat analogue products. The composition is granular, and is prepared by a process involving making a hard fibrous gel, and reducing the size thereof to particles of about 2 mm to 10 mm particle size. In some embodiments, granules are mixed with aligned protein fibres, and then chopped. The process of making the aligned protein fibres can be conducted by extrusion. To this end an extrusion die is used that serves to align fibres.

In any event, the resulting chopped structure does not resemble a fibrous muscle meat, and the process requiring fibre alignment results in a simplification of a meat structure. Moreover, the process does not provide the versatility to produce meat analogues ranging from minced meat analogues to steak analogues.

A general background reference on protein structuring is Cheftel et al., Food Reviews International 8(2), 235-275 (1992). Herein a protein texturization process is described, involving extrusion cooking at high moisture levels. The document relates to a broad range of products. E.g. it is described how fish proteins are restructured, how cheese-like products can be made, and how extrusion cooking can be used to create fat substitutes. It will be appreciated that the disclosed structures are not at all alike meat of land-animals.

The background art further includes U.S. Pat. No. 4,276,319. Therein the production of a dense, granulated protein gel is disclosed which, upon rehydration, is to function as a meat extender in natural meat products. The disclosure does not provide a meat analogue of a meat-like structure that would be suitable per se as a meat replacement, rather than as an extender.

Yet another background reference is Kitabatake, Journal of Food Science vol. 50, 1985, pages 1260-1264. Therein the production of gels from soy protein isolate is disclosed. The disclosure is not directed to making meat-analogues, and the disclosed gels do not satisfy the corresponding texture requirements.

SUMMARY OF THE INVENTION

In order to better address the foregoing and other desires, the invention, in one aspect, presents a process for the preparation of a structured vegetable protein extrudate, comprising the steps of
  (a) providing an aqueous protein composition comprising vegetable protein, wherein the protein content based on dry matter is below 9Q % by weight;
  (b) subjecting the aqueous protein composition to one or more kneading steps so as to form a dough;
  (c) subjecting the dough to heating to above the denaturation temperature of the protein;
  (d) subjecting the dough to shear forces and pressure in an extruder, so as to form a fibrous protein composition;
  (e) allowing the fibrous protein composition to exit the extruder through an extruder die;
wherein the water content of the aqueous protein composition is at least 50% by weight, and wherein fibrous protein composition is subjected to limited cooling so as to exit the extruder at a temperature, of the composition, of at least the boiling temperature of water in said first outside environment.

In another aspect, the invention is a process for the preparation of a structured vegetable protein composition, wherein a structured vegetable protein extrudate is made by a method as described above, and wherein the extrudate is subjected to infusion by an aqueous liquid.

In a still further aspect, the invention provides the use of a method as described above for the production of a range of meat-like structures, wherein the choice of one or more temperature values in step (c) is used as a tool to determine the desired fibrosity, and the water content introduced by the infusion with the aqueous liquid is used to determine the desired tenderness.

In another aspect, the invention presents a structured vegetable protein product comprising 0.1-20 wt. % of fat, preferably 0.2-10 wt. %.

In a still further aspect, the invention provides a structured vegetable protein product obtainable by the aforementioned method, wherein the product satisfies a water-absorption capacity of at least 50% measured in accordance with a test conducted as follows:
 (a) providing a piece of the product of 50 g each;
 (b) measuring the precise weight of the piece;
 (c) submerging the piece separately in boiling water;
 (d) keeping the piece in boiling water for 20 minutes;
 (e) taking the piece out of the water and allowing it to drain for 1 minute;
 (f) measuring the weight of the drained piece;
 (g) repeating steps (a)-(f) with 3 further pieces;
 (h) determining the average weight of the four pieces at step (b);
 (i) determining the average weight of the four pieces at step (f);
 (j) subtracting the outcome of (h) from the outcome of (i) so as to obtain the average weight increase as a measure for the water-absorption capacity.

DETAILED DESCRIPTION OF THE INVENTION

In a broad sense, the invention is based on the judicious recognition to combine the extrusion of a protein composition having a relatively high moisture content with allowing the extrudate to exit the extruder at a temperature of at least the boiling temperature of water.

Thus, the invention presents a process for the preparation of a structured vegetable protein extrudate, comprising the steps of
 (a) providing an aqueous protein composition comprising vegetable protein;
 (b) subjecting the aqueous protein composition to one or more kneading steps so as to form a dough;
 (c) subjecting the dough to heating to above the denaturation temperature of the protein;
 (d) subjecting the dough to shear forces and pressure in an extruder, so as to form a fibrous protein composition;
 (e) allowing the fibrous protein composition to exit the extruder through an extruder die;
wherein the water content of the aqueous protein composition is at least 50% by weight, and wherein fibrous protein composition is subjected to limited cooling so as to exit the extruder at a temperature, of the composition, of at least the boiling temperature of water in said first outside environment.

Without wishing to be bound by theory, the inventors believe that the foregoing combination of features is responsible for the creation of a relatively open structure in the composition when it leaves the extruder. This open structure has an improved capability of being infused with an aqueous liquid, and thus presents a choice of creating a lower or higher tenderness, dependent on the percentage of water thus added.

The vegetable protein source preferably has a protein content of below 9Q % by weight of the dry matter of the composition. This defines a protein content essentially below that of protein compositions recognized in the art as "protein isolates". Such lower protein content compositions have been found by the inventors to be unexpectedly better suitable to create meat-like structures.

For the sake of optimal processing into meat-like, fibrous structures, it is preferred that the protein content, based on dry matter of the protein composition, is in a range of from 15% by weight to 85% by weight, and more preferably of from 35% by weight to 85% by weight. Still more preferably, said protein content is 50% by weight to 80% by weight. Most preferably, the protein content of the protein composition subjected to extrusion is 65% by weight to 75% by weight, again based on dry matter of the composition.

The fibrous composition obtained in the extruder, exits the extruder at a temperature, of the composition, higher than the applicable boiling temperature of water (e.g. 100° C. at atmospheric pressure, or lower in the event that a vacuum port is used). This is believed to result in expansion and subsequent collapsing of the texturized product. The expansion/collapsing treatment is believed to disturb the fibre orientation and thus to result in the formation of a more random orientation of the formed fibres. Next to that, it is believed to lead to formation of air pockets (on micro and macroscale) in the texturized product.

To fine-tune mouth feel (bite), tenderness and juiciness the texturizing process can be followed by hydration of the extruded product in an aqueous liquid, at elevated temperatures, i.e. between 40 and 150° C., until a final moisture content of 50 till 95% is reached. Shear blade testing is most commonly used for measurement tenderness, for instance Warner Bratzler shear blade or the Kramer shear cell.

The product of the invention has a heterogeneous structure and a relatively large free volume. This contributes to its relatively high water-absorption capacity. This is of advantage, since the absorption of aqueous liquids facilitates adding desired taste components, as well as allows to vary the product in terms of juiciness and bite.

The infusion of the extrudate according to the invention occurs on wet product as obtained by extrusion. In deviation from the background art, the extrudate of the present invention does not require drying and rehydration. It essentially remains wet, and is then further filled with water, or another aqueous composition, by infusion. The extrudate preferably has a water-content of 55% by weight to 70% by weight. The structured vegetable protein composition resulting from infusion with an aqueous liquid preferably has a water-content of from 70% by weight to 90% by weight.

Surprisingly, the aforementioned infusion by an aqueous liquid can be improved (i.e. proceeding more rapidly and/or allowing the incorporation of more water) if the extrudate has first been frozen (and then thawed prior to infusion). Preferably, the freezing temperature is below −5° C. and, more preferably below −15° C.

During extrusion, the composition is heated to a temperature above the denaturation temperature of the protein. For soy bean protein this means a temperature of at least 130° C. Preferably the extrusion is conducted at a temperature of at least 150° C. A preferred maximum temperature is 200° C.

It will be understood that the process temperature can be lowered by measures to lower the protein's iso-electric point, e.g. by lowering pH and/or by the addition of proteases. It is preferred according to the invention to produce as pure a protein product as possible, and thus the addition of acid and/or protease is preferably avoided.

The term "structured vegetable protein product" implies that a product is provided comprising vegetable protein, wherein the vegetable protein is comprised in a man-made structure. According to the invention, this structure is obtainable by the extrusion method referred to above.

A wide range of meat-like fibrous structures can be prepared. The desired structural properties are generally determined by the fibrosity (fibrousnesses) of the extrudate, and the aforementioned tenderness. Fibrosity, as is known to the skilled person, can best be determined by means of visual inspection of the extrudate itself, or of a photograph thereof. If desired, the inspection can be done via a microscope. In any event, the determination amounts to a visual assessment, if needed using a device to measure lengths, such as a graduated rod. In general a higher degree of fibrosity (longer fibres) is obtained upon applying a higher temperature during extrusion. A lower temperature will lead to shorter fibres. In general fibres of pork-like fibrous structure will be prepared at the lower end of the above mentioned temperature ranges, a chicken-like fibrous structure will result from an intermediate temperature, and a squid-like fibrosity will result from temperatures at the high-end of the ranges. In connection herewith, the invention also pertains to the use of a method as substantially described hereinbefore, for the production of a range of a meat-like fibrous structured vegetable protein composition, wherein the choice of one or more temperature values in step (c) is used as a tool to determine the desired fibrosity. Temperature settings are a normal tool for the skilled person to influence the outcome of an extrusion process. However, it is a surprising achievement of the present invention that the adjustment of temperature has the effect of fine-tuning the extrudates' fibrosity. It should be noted that the invention, in accordance with this aspect, is not limited to any specific value for fibrosity, but is directed to the fact that by the relatively simple act of adjusting temperature a wide range of products of any desired fibrosity can be produced.

It should be noted that the process of the invention, in deviation from the standard approach in the art, does not aim at a structural imitation of the fibrous structure of the meat to be replaced. Surprisingly, the process of the invention results in a product having its own fibrous structure, that is essentially capable of providing a "bite" that is perceived as being meat-like.

The process of the invention allows an as yet unachievable versatility, by the fact that not only the degree fibrosity can be tuned, as above, but independently also the degree of tenderness, as a small but significant percentage of the final water-content of the product is determined by the water added through the infusion step after extrusion. It will be appreciated that the range of temperatures (determining the range of fibrosity achievable), and the range of water percentages that can be incorporated into the structure (as a result of the openness created upon exit at the extruder) present a great variety of permutations that enable the production of a more or less fibrous and more or less tender product.

The present invention will further be described with respect to particular embodiments. The invention is not limited thereto but only by the claims. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The aforementioned extrusion process starts with providing a protein from a vegetable source. Vegetable sources include plant sources, including algae. This protein can be from a mixture of sources, e.g. soy bean protein, lupin protein, wheat protein. Preferably, protein sources devoid of gluten are used. It is not excluded that proteins from non-vegetable sources are present in addition to the vegetable protein, including proteins from animal sources. This is not preferred, and one if the advantages of the present invention is that a meat-perception structure can be actually produced without using animal protein.

Preferred vegetable proteins are soy bean protein, more preferably soy protein isolate or soy protein concentrate. Soy protein isolate is a highly refined or purified form of soy protein with a minimum protein content of 90% on a moisture-free basis. It is made from defatted soy flour which has had most of the non-protein components, fats and carbohydrates removed. Soy flour refers to a comminuted form of defatted soybean material, preferably containing less than about 22% oil, formed of particles having a size such that the particles can pass through a No. 100 mesh (U.S. Standard) screen. Soy protein concentrate is a defatted soy material having a protein content of from about 65% to less than about 90% soy protein on a moisture-free basis.

In providing meat-replacement it can be desired to include fat in the composition. This is generally difficult to achieve with existing processes. In the process of the invention, fat can be added to the product via the dough, via the infusion liquid, or both. An advantage of the method of the invention is that, particularly by virtue of the use of an infusion liquid, an amount of fat can be included (e.g. 0.1-20% by weight, preferably 0.2-10 wt._%, more preferably at least 5%), that it substantially higher than for pre-existing textured protein products based on vegetable protein. In this respect the invention, in one aspect, also relates to a structured vegetable protein product obtainable by the aforementioned method, comprising 0.1-20 wt. % of fat, preferably 0.2-10 wt. % of fat. In one interesting embodiment, the amount of fat is 0.2-1 wt. %. In another interesting embodiment, the amount of fat is higher than 1 wt. % and up to 20 wt. %, preferably 5-10 wt. %. The term "fat", as used herein, serves to include fats, oils, and other lipids.

In accordance with the invention, an aqueous protein composition is provided, the composition is subjected to kneading to form a dough, and the dough (after heating) is subjected to shear and pressure in an extruder.

The process can be conducted by providing a first section of an extruder with a protein from a vegetable source and water so as to form an aqueous protein composition; it can also be done by adding water in one or more subsequent sections of the extruder, or in both in an initial section and in one or more subsequent section. The aqueous protein composition can also be prepared in a separate premixing zone after which it is provided to the extruder. The composition can also be in the form of a premixed dough that is pumped into the extruder.

An extruder generally comprises a plurality of temperature controlled zones or sections through which the protein product mixture is conveyed under mechanical pressure prior to exiting the extrusion apparatus through an extrusion die assembly.

The skilled person is aware of suitable extrusion apparatuses. These are, e.g., a double barrel, twin-screw extruder as described, for example, in U.S. Pat. No. 4,600,311. Further examples of suitable commercially available extrusion apparatuses include a CLEXTRAL Model BC-45, a CLEXTRAL Model BC-63 extruder manufactured by Clextral, Inc. (St Etienne France); a WENGER Model TX-57 extruder, a WENGER Model TX-168 extruder, and a WENGER Model TX-52 extruder all manufactured by Wenger Manufacturing, Inc. (Sabetha, Kans.), a BÜHLER BCTG-40 and a BÜHLER BCTG-62 both manufactured by Bühler AG (Uzwil, Switzerland). Other conventional extruders suitable for use in this invention are described, for example, in U.S. Pat. Nos. 4,763,569, 4,118,164, and 3,117,006.

It is preferred to use an extruder having a ratio of length:diameter (L/D) greater than 20, preferably greater than 30, and more preferably having an L/D greater than 40. The upper limit is not critical for the invention, and will be determined by practical or mechanical considerations. A preferred upper limit is an L/D of 50. A higher L/D (preferably above 40) is particularly preferred if mixing water and protein composition takes place in the extruder. The L/D can conveniently be about 10-15 lower (preferably still above 30). if the mixing is done prior to entry into the extruder.

The extruder can be single screw but is preferably of the twin-screw type. The screws of a twin-screw extruder can rotate within the barrel in the same or opposite directions. Rotation of the screws in the same direction is referred to as single flow whereas rotation of the screws in opposite directions is referred to as double flow. The speed of the screw or screws of the extruder may vary depending on the particular apparatus; however, it is typically from about 50 to about 1500 revolutions per minute (rpm). The extrusion apparatus contains screws assembled from shafts and worm segments, as well as mixing lobe and ring-type shear lock elements as recommended by the extrusion apparatus manufacturer for extruding plant protein product.

A section of an extruder can either be visibly distinguishable as a sub-part of an extruder, or it can be functionally be a sub-part (e.g. zones allowing different heating or cooling regimes can define different sections).

The aforementioned first section preferably forms the entrance (introduction section) of the extruder.

In addition to protein, also water is provided to said first section. The protein and the water can be introduced into the extruder in any order, as long as in subsequent sections of the extruder the material being extruded comprises an aqueous protein composition. E.g., the protein and water can be premixed and then introduced into the extruder, or part of the protein and the water can be premixed and the remained added separately. Preferably, the protein and water starting materials are provided separately, and are not mixed until their being introduced into the extruder. More preferably, the stream or streams of protein and a stream of water are introduced substantially simultaneously into the extruder. The protein and the water are introduced preferably at a temperature below the denaturation temperature of the protein, and are preferably not heated. The first section of the extruder also is preferably neither heated nor cooled.

The aqueous protein composition as being extruded generally has a water content of at least 50 wt. %, more preferably at least 60 wt. %. The maximum water-content should be such as to still allow the extruder to provide a structure to the composition. The maximum water content preferably is 70 wt. %, more preferably 65 wt. %.

In one or more subsequent sections, the treatments of kneading, heating, and shearing the aqueous protein composition are conducted. Before and/or during these steps, the composition is heated to above the denaturation temperature of the protein. In general, the kneading and heating will take place simultaneously, although it is conceivable to start kneading before heating, or to not start kneading until after denaturation has occurred.

The kneading results in a dough that is subjected to shear forces and pressure. These forces are exerted in one or more sections and serve to provide a microfiber structure. The absolute pressures and shear forces used will differ per extruder type. The skilled person will be able to tune these values without undue experimentation by simple inspection of a few trial extrudates.

In a final section, just preceding the opening through which the extrudate leaves the extruder, the pressure is preferably lowered as compared to the previous sections.

The aforesaid opening is provided in an extruder die assembly. Since the extruded mass is heated, it is desired that cooling is provided prior to the extrudate exiting the extruder. This cooling can be done in a section prior to the die assembly, but preferably a so-called "cooling die" is used. Such a die comprises a longitudinal section in which cooling is provided, and the actual die, i.e. the opening to a first environment outside of the extruder.

In an interesting embodiment, the extruder die is a sheet-type die having an opening the largest dimension of which is larger than the length of the longitudinal section. This is a considerably change as compared to regular cooling dies, which are relatively long. Taking the two dimensions of the opening (say: height and width), the smaller dimension (say the height) is preferably relatively small, e.g. one hundredth to one tenth of the larger dimension (i.e. the width). The aforementioned longitudinal section of the die assembly (i.e. the section directly preceding the opening) preferably has substantially the same width and height dimensions as the opening.

Without wishing to be bound by theory, the inventors believe that the foregoing preferred die assembly contributes to obtaining a fibrous structure that is not only provided in longitudinal direction, but also in other directions under an angle with the longitudinal fibres. In other words, the die assembly (which is hardly or not used for its regular purpose—cooling) is used in the invention to provide an orientation to the fibrosity. The lower die pressure, but combined with the relatively high shear forces caused by the shape of the die, result in a macrofiber, layered, structure that contributes to the favourable bite of the extrudate. Generally, a product is obtained having a double fibrous structure, having larger fibres in one direction, and smaller fibres in a different direction.

Via the die, the extrudate enters into a first outside environment. Hereby the temperature of the composition is secured to be above the boiling point of water in said environment. It will be understood that if, as preferred, the environment is at atmospheric pressure, the boiling point of water will be 100° C. It will also be understood that the temperature may be lower or higher depending on the exact atmospheric pressure. As a result, the extrudate will expand to some extent, on account of gaseous bubbles formed therein. These gaseous bubbles will result in cavities, i.e. an open structure, that can be accommodated to take up water. It will be appreciated that this is different from regular marinating or infusion. The addition of water, in 0 wt. % to 100 wt. %, preferably 25 wt. % to 75 wt. % of the total water content, by virtue of the open structure created, provides a novel and judicious way of determining the tenderness of the product obtained from the extrudate and, together with the fibrosity and preferably the double fibrosity mentioned above, the meat-like character of the product.

As referred to above, the water uptake preferably is conducted through a process of infusion with an aqueous liquid. The aqueous liquid is preferably heated, more preferably to a temperature of 50° C. to 100° C., more preferably 70° C. to 98° C. The aqueous liquid can be water. As a matter of choice, the aqueous liquid can also be used to provide a flavour to the composition. To this end, the aqueous liquid preferably is a broth. Depending on the intended end-use, stronger or softer flavours can be added.

In connection herewith, the invention, in another embodiment, also presents a process for the preparation of a meat analogue, wherein a structured vegetable protein extrudate is made by a method as described above, and wherein the extrudate is subjected to infusion by an aqueous liquid, preferably a heated liquid, and more preferably a broth.

As explained above, the possibilities to tune both the fibrosity and the tenderness enable the use of the process of the invention for the manufacture of a range of meat-like products on the basis of vegetable protein.

In connection herewith, in yet another aspect, the invention provides the use of a method as described above for the production of a range of meat-like structures, wherein the choice of one or more temperature values in step (c) is used as a tool to determine the desired fibrosity, and the water content introduced by the infusion with the aqueous liquid is used to determine the desired tenderness.

In addition to allowing the tuning the fibrous structures as well as the tenderness of a structured vegetable protein product, the process of the invention leads to a novel approach of providing meat-replacement. The structured vegetable protein product of the invention, by virtue of the extrusion and infusion process, is capable of providing the consumer with a bite and mouth feel that gives the impression of meat, without necessarily copying the actual fibrous structure of meat. The invention therewith also presents the identification of a technical problem that is different from the way this has been addressed in the art. This technical problem, rather than how to copy meat structures in a structured vegetable protein product, is how to provide a structure having a fibrous character and tenderness that is perceived by the consumer as being meat-like.

The products of the invention are generally obtained as a continuous extrudate and can be cut to size at will. The resulting meat-like product will be a semi-final article, that can be further processed by cutting, milling, or other techniques to produce desired shapes and sizes so as to produce an article that is ready for being processed by a cook (e.g. by frying it, providing it with flavours or, in whichever other way, incorporating it into a dish).

The invention will be illustrated with reference to the following, non-limiting Example.

EXAMPLE

In this example, a Clextral BC45 twin-screw extruder is used for the preparation of a structured composition on the basis of soy bean protein. The extruder has a length of 150 cm and a length to diameter (L/D) ratio of 27. The extruder is divided into six sections of 25 cm each. The first section is an introduction section that is not cooled or heated. The table below summarizes the processing in the various sections.

| Section | Temp. ° C. | Process |
|---|---|---|
| 1 | — | 25 cm transport |
| 2 | 80 | 25 cm transport and pressure building |
| 3 | 150 | 20 cm transport, increasing pressure building, 5 cm mixing |
| 4 | 150 | 5 cm mixing, 20 cm transport and pressure reduction |
| 5 | 150 | 20 cm transport, 5 cm mixing |
| 6 | 90 | 25 cm transport and pressure increase |

To the introduction section 8.4 kg/hr soy concentrate is added (the % protein of the concentrate is 69±3%) and 12.9 kg/hr water (using a plunger pump). The rotation rate of the extruder is 165 rpm. The extruder is provided with a sheet-die having the dimensions: length 90 mm, width 150 mm, and height 3.15 mm. By allowing water to flow through the sheet-die, the extrudate is cooled, but to a limited extent, viz. a temperature of between 100° C. and 120° C. The extrudate is subsequently infused with water, or with a mixture of water and flavours.

The invention claimed is:

1. A structured soybean protein extrudate, obtained by a process comprising the steps of:
   (a) providing an aqueous soy protein composition having a protein content based on dry matter of at least 15% by weight and below 85% by weight;
   (b) subjecting the aqueous soy protein composition to one or more kneading steps so as to form a dough;
   (c) subjecting the dough to heating to above a denaturation temperature of the soy protein;
   (d) subjecting the dough to shear forces and pressure in an extruder, so as to form a fibrous soy protein composition;
   (e) allowing the fibrous soy protein composition to exit the extruder as an extrudate into a first outside environment, whereby the extrudate enters said first outside environment through an extruder die;
      wherein the fibrous soy protein composition is subjected to limited cooling such that the extrudate, upon exiting the extruder into said first outside environment, has a temperature of at least a boiling temperature of water in said first outside environment, thereby forming a cooled fibrous protein composition having enhanced porosity and/or randomization of fiber orientation relative to a second cooled fibrous protein composition obtained by a process comprising the steps of:
   (a) providing a second aqueous soy protein composition having a protein content based on dry matter of at least 15% by weight and below 85% by weight;
   (b) subjecting the second aqueous soy protein composition to one or more kneading steps so as to form a second dough;
   (c) subjecting the second dough to heating to above a denaturation temperature of the soy protein;
   (d) subjecting the second dough to shear forces and pressure in an extruder, so as to form a second fibrous soy protein composition;
   (e) allowing the second fibrous soy protein composition to exit the extruder as a second extrudate into a first outside environment, whereby the second extrudate enters said first outside environment through an extruder die;
      wherein the second fibrous soy protein composition is subjected to cooling such that the second extrudate, upon exiting the extruder into said first outside environment, has a-temperature below the boiling temperature of water in said first outside environment, thereby forming the second cooled fibrous protein composition.

2. The structured soybean protein extrudate of claim 1, comprising 0.1-20 wt. % of fat.

3. The structured soybean protein extrudate of claim 1, comprising 0.2-10 wt. % of fat.

4. The structured soybean protein extrudate of claim 1, infused with an aqueous liquid.

5. The structured soybean protein extrudate of claim 4, wherein the aqueous liquid is water comprising flavors.

6. The structured soybean protein extrudate of claim 4, wherein the aqueous liquid is a broth.

7. The structured soybean protein extrudate of claim 1, wherein the structured soybean protein extrudate has a water-absorption capacity of at least 50% by weight.

8. The structured soybean protein extrudate of claim 1, wherein the denaturation temperature is at least 130° C.

9. The structured soybean protein extrudate of claim 1, wherein the aqueous soy protein composition has a water content of at least 50% by weight.

10. The structured soybean protein extrudate of claim 1, wherein the aqueous soy protein composition has a water content of at least 60% by weight.

11. The structured soybean protein extrudate of claim 1, having a water content of at least 55% by weight.

12. The structured soybean protein extrudate of claim 1, having a water content of 55% by weight to 70% by weight.

13. A structured soybean protein extrudate comprising:
an extrudate from a fibrous soy protein passing through an extruder at a temperature of at least a boiling temperature of water into a first outside environment, thereby forming the structured soybean protein extrudate having enhanced porosity and/or randomization of fiber orientation relative to a second structured soybean protein extrudate, wherein
the fibrous soy protein is obtained by subjecting a dough to shear forces and pressure in the extruder;
the dough is obtained by denaturing an aqueous soy protein composition by heating the aqueous soy protein composition above a denaturation temperature of the aqueous soy protein composition; and
the aqueous soy protein composition has a protein content based on dry matter of at least 15% by weight and below 85% by weight;
wherein the second structured soybean protein extrudate comprises:
a second extrudate from a second fibrous soy protein passing through an extruder at a temperature of below the boiling temperature of water into the first outside environment, thereby forming the second structured soybean protein extrudate; wherein
the second fibrous soy protein is obtained by subjecting a second dough to shear forces and pressure in the extruder;
the second dough is obtained by denaturing a second aqueous soy protein composition by heating the second aqueous soy protein composition above a denaturation temperature of the second aqueous soy protein composition; and
the second aqueous soy protein composition has a protein content based on dry matter of at least 15% by weight and below 85% by weight.

14. The structured soybean protein extrudate of claim 13, comprising 0.1-20 wt. % of fat.

15. The structured soybean protein extrudate of claim 13, infused with an aqueous liquid.

16. The structured soybean protein extrudate of claim 15, wherein the aqueous liquid is one of water comprising flavors or a broth.

17. The structured soybean protein extrudate of claim 13, wherein the structured soybean protein extrudate has a water-absorption capacity of at least 50% by weight.

18. The structured soybean protein extrudate of claim 13, wherein the denaturation temperature is at least 130° C.

19. The structured soybean protein extrudate of claim 13, wherein the aqueous soy protein composition has a water content of at least 50% by weight.

20. The structured soybean protein extrudate of claim 13, wherein the aqueous soy protein composition has a water content of at least 60% by weight.

21. The structured soybean protein extrudate of claim 13, having a water content of at least 55% by weight.

22. The structured soybean protein extrudate of claim 13, having a water content of 55% by weight to 70% by weight.

* * * * *